US011428006B2

(12) United States Patent
Krasnoff et al.

(10) Patent No.: US 11,428,006 B2
(45) Date of Patent: *Aug. 30, 2022

(54) CEMENTITIOUS COMPOSITE CONSTITUENT RELATIONSHIPS

(71) Applicant: Cortex Composites, Inc., Pacific Palisades, CA (US)

(72) Inventors: Curren E. Krasnoff, Pacific Palisades, CA (US); Neal S. Berke, Portage, MI (US)

(73) Assignee: CORTEX COMPOSITES, INC., San Rafael, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/878,122

(22) Filed: May 19, 2020

(65) Prior Publication Data

US 2020/0277787 A1 Sep. 3, 2020

Related U.S. Application Data

(63) Continuation of application No. 16/266,891, filed on Feb. 4, 2019, now Pat. No. 11,098,486, which is a
(Continued)

(51) Int. Cl.
*E04C 5/00* (2006.01)
*E04C 5/07* (2006.01)
(Continued)

(52) U.S. Cl.
CPC ............... *E04C 5/00* (2013.01); *B32B 3/20* (2013.01); *B32B 3/28* (2013.01); *B32B 3/30* (2013.01);
(Continued)

(58) Field of Classification Search
CPC .. C04B 7/00; C04B 9/00; C04B 11/00; C04B 12/00; B32B 13/00; B32B 2260/044;
(Continued)

(56) References Cited

U.S. PATENT DOCUMENTS 984,121 A 2/1911 Condie
2,958,593 A 11/1960 Hoover et al.
(Continued)

FOREIGN PATENT DOCUMENTS

CN 201185779 Y 1/2009
CN 101500790 8/2009
(Continued)

OTHER PUBLICATIONS

U.S. Appl. No. 15/806,980, filed Nov. 8, 2017, Cortex Composites, Inc.
(Continued)

*Primary Examiner* — Jennifer A Steele
(74) *Attorney, Agent, or Firm* — Wilson Sonsini Goodrich & Rosati

(57) ABSTRACT

A cementitious composite includes a first layer, a second layer, and a cementitious mixture disposed between the first layer and the second layer. The cementitious mixture includes (i) cementitious materials and (ii) a viscosity modifier and/or an accelerator. The cementitious materials provide a void fraction between 0.64 and 1.35. The void fraction is defined as the ratio of the volume of the voids within the cementitious mixture per unit area of the cementitious composite to the volume of the cementitious materials per unit area of the cementitious composite. The cementitious mixture is configured to absorb a mass of water that provides a maximum 28 day compressive strength of the cementitious composite. A ratio of the mass of the water relative to the mass of the cementitious materials of the cementitious mixture per unit area of the cementitious composite that provides the maximum 28 day compressive strength of the cementitious composite is between 0.25 and 0.55.

20 Claims, 3 Drawing Sheets

Related U.S. Application Data continuation of application No. 15/807,373, filed on Nov. 8, 2017, now Pat. No. 10,221,569.

(51) Int. Cl.

| | | |
|---|---|---|
| B32B 27/14 | (2006.01) | |
| B32B 13/12 | (2006.01) | |
| E01C 11/18 | (2006.01) | |
| E01C 9/00 | (2006.01) | |
| B32B 13/02 | (2006.01) | |
| B32B 13/14 | (2006.01) | |
| B32B 27/32 | (2006.01) | |
| B32B 7/10 | (2006.01) | |
| B32B 5/22 | (2006.01) | |
| B32B 7/12 | (2006.01) | |
| B32B 3/30 | (2006.01) | |
| B32B 5/02 | (2006.01) | |
| B32B 5/16 | (2006.01) | |
| B32B 5/06 | (2006.01) | |
| B32B 27/12 | (2006.01) | |
| B32B 5/26 | (2006.01) | |
| B32B 3/28 | (2006.01) | |
| B32B 27/30 | (2006.01) | |
| B32B 27/36 | (2006.01) | |
| B32B 3/20 | (2006.01) | |
| B32B 3/26 | (2006.01) | |
| B32B 7/05 | (2019.01) | |

(52) U.S. Cl.
CPC .............. *B32B 5/022* (2013.01); *B32B 5/024* (2013.01); *B32B 5/026* (2013.01); *B32B 5/028* (2013.01); *B32B 5/06* (2013.01); *B32B 5/16* (2013.01); *B32B 5/22* (2013.01); *B32B 5/26* (2013.01); *B32B 7/10* (2013.01); *B32B 7/12* (2013.01); *B32B 13/02* (2013.01); *B32B 13/12* (2013.01); *B32B 13/14* (2013.01); *B32B 27/12* (2013.01); *B32B 27/14* (2013.01); *B32B 27/304* (2013.01); *B32B 27/306* (2013.01); *B32B 27/32* (2013.01); *B32B 27/36* (2013.01); *E01C 9/001* (2013.01); *E01C 11/18* (2013.01); *E04C 5/07* (2013.01); *E04C 5/073* (2013.01); *B32B 3/266* (2013.01); *B32B 7/05* (2019.01); *B32B 2250/02* (2013.01); *B32B 2250/03* (2013.01); *B32B 2250/04* (2013.01); *B32B 2255/02* (2013.01); *B32B 2255/10* (2013.01); *B32B 2260/021* (2013.01); *B32B 2260/044* (2013.01); *B32B 2262/02* (2013.01); *B32B 2262/0223* (2013.01); *B32B 2262/0253* (2013.01); *B32B 2262/0261* (2013.01); *B32B 2262/06* (2013.01); *B32B 2262/062* (2013.01); *B32B 2262/101* (2013.01); *B32B 2262/103* (2013.01); *B32B 2262/106* (2013.01); *B32B 2264/10* (2013.01); *B32B 2307/31* (2013.01); *B32B 2307/54* (2013.01); *B32B 2307/546* (2013.01); *B32B 2307/71* (2013.01); *B32B 2307/7166* (2013.01); *B32B 2307/72* (2013.01); *B32B 2307/726* (2013.01); *B32B 2307/7265* (2013.01); *B32B 2410/00* (2013.01); *B32B 2419/00* (2013.01); *B32B 2471/00* (2013.01); *Y10T 428/24702* (2015.01); *Y10T 428/249932* (2015.04); *Y10T 442/198* (2015.04); *Y10T 442/361* (2015.04); *Y10T 442/3797* (2015.04); *Y10T 442/653* (2015.04); *Y10T 442/699* (2015.04)

(58) Field of Classification Search
CPC . E01C 9/001; E01C 11/18; E04C 5/00; E04C 5/07; E04C 5/073
See application file for complete search history.

(56) References Cited

U.S. PATENT DOCUMENTS

| | | |
|---|---|---|
| 3,373,741 A | 3/1968 | Hill et al. |
| 3,537,121 A | 11/1970 | McAvoy |
| 3,754,954 A * | 8/1973 | Gabriel ............... C04B 40/00 106/674 |
| 3,897,073 A | 7/1975 | Swanson et al. |
| 3,900,024 A | 8/1975 | Lauber et al. |
| 3,917,285 A | 11/1975 | Swanson et al. |
| 4,235,228 A | 11/1980 | Gaylord et al. |
| 4,437,271 A | 3/1984 | McAvoy |
| 4,485,137 A | 11/1984 | White |
| 4,488,909 A | 12/1984 | Galer et al. |
| 4,495,235 A | 1/1985 | Tesch |
| 4,617,219 A | 10/1986 | Schupack |
| 4,622,260 A | 11/1986 | Tesch |
| 5,041,330 A | 8/1991 | Heerten et al. |
| 5,102,726 A | 4/1992 | Gabbay |
| 5,112,665 A | 5/1992 | Alexander |
| 5,174,231 A | 12/1992 | White |
| 5,234,754 A * | 8/1993 | Bache ............... C04B 28/04 106/725 |
| 5,346,566 A | 9/1994 | White |
| 5,461,885 A | 10/1995 | Yokoyama et al. |
| 5,475,904 A | 12/1995 | Le Roy |
| 5,527,387 A | 6/1996 | Andersen et al. |
| 5,543,188 A | 8/1996 | Te'Eni |
| 5,589,245 A | 12/1996 | Roell |
| 5,631,097 A | 5/1997 | Andersen et al. |
| 5,651,641 A | 7/1997 | Stephens et al. |
| 6,156,406 A | 12/2000 | Rock et al. |
| 6,284,681 B1 | 9/2001 | Langton et al. |
| 6,461,317 B1 | 10/2002 | Grim et al. |
| 6,477,865 B1 | 11/2002 | Matsumoto |
| 6,586,083 B1 | 7/2003 | Weiss et al. |
| 6,630,414 B1 | 10/2003 | Matsumoto |
| 6,723,416 B1 | 4/2004 | Groitzsch et al. |
| 7,465,283 B2 | 12/2008 | Grim et al. |
| 7,552,604 B1 | 6/2009 | Waldrop et al. |
| 7,607,730 B2 | 10/2009 | Moseneder |
| 7,611,999 B2 | 11/2009 | McMurray |
| 7,721,749 B2 | 5/2010 | Brewin et al. |
| 7,762,970 B2 | 7/2010 | Henderson et al. |
| 7,763,339 B2 | 7/2010 | Groitzsch et al. |
| 7,849,715 B2 | 12/2010 | Starbuck et al. |
| 7,913,520 B1 | 3/2011 | Chen et al. |
| 7,937,973 B2 | 5/2011 | Sorensen et al. |
| 7,960,603 B2 | 6/2011 | Evans |
| 8,287,982 B2 | 10/2012 | Brewin et al. |
| 8,343,609 B2 | 1/2013 | Crawford et al. |
| 8,703,266 B2 | 4/2014 | Crawford et al. |
| 9,187,902 B2 | 11/2015 | Krasnoff et al. |
| 9,238,591 B2 * | 1/2016 | Guynn ............... C04B 28/04 |
| 9,567,750 B2 | 2/2017 | Krasnoff et al. |
| 10,221,569 B2 * | 3/2019 | Krasnoff ............ B32B 5/024 |
| 11,098,486 B2 * | 8/2021 | Krasnoff ............ B32B 13/12 |
| 2001/0002412 A1 | 5/2001 | Kolarik |
| 2002/0090871 A1 | 7/2002 | Ritchie et al. |
| 2003/0077965 A1 | 4/2003 | Mack et al. |
| 2004/0097151 A1 | 5/2004 | McMurray |
| 2006/0099415 A1 | 5/2006 | Morin |
| 2006/0155223 A1 | 7/2006 | Koch |
| 2007/0206994 A1 | 9/2007 | Olsta et al. |
| 2007/0238392 A1 | 10/2007 | Starbuck et al. |
| 2007/0293112 A1 | 12/2007 | Hanson et al. |
| 2008/0017229 A1 | 1/2008 | Brewin et al. |
| 2008/0118735 A1 | 5/2008 | Kanao |
| 2008/0287852 A1 | 11/2008 | Evans |
| 2010/0233417 A1 | 9/2010 | Brewin et al. |
| 2010/0319832 A1 | 12/2010 | Herbert et al. |
| 2011/0086214 A1 | 4/2011 | Rockwell |

(56) References Cited

U.S. PATENT DOCUMENTS

| | | | |
|---|---|---|---|
| 2011/0311755 A1* | 12/2011 | Crawford | D04B 21/14 428/68 |
| 2012/0223004 A1 | 9/2012 | Ferraiolo | |
| 2013/0129946 A1 | 5/2013 | Crawford et al. | |
| 2014/0170916 A1* | 6/2014 | Krasnoff | B32B 5/16 442/58 |
| 2014/0205776 A1 | 7/2014 | Crawford et al. | |
| 2015/0099098 A1 | 4/2015 | Bahukudumbi et al. | |
| 2015/0099410 A1 | 4/2015 | Bahukudumbi et al. | |
| 2015/0352804 A1 | 12/2015 | Kohlman et al. | |
| 2015/0352809 A1 | 12/2015 | Kohlman et al. | |
| 2016/0052236 A1 | 2/2016 | Krasnoff et al. | |
| 2016/0060169 A1* | 3/2016 | Byrd | C04B 28/04 106/676 |
| 2016/0186434 A1 | 6/2016 | Krasnoff et al. | |
| 2018/0066430 A1 | 3/2018 | Krasnoff et al. | |
| 2019/0135707 A1 | 5/2019 | Krasnoff et al. | |

FOREIGN PATENT DOCUMENTS

| | | |
|---|---|---|
| CN | 101802322 | 8/2010 |
| CN | 101863631 A | 10/2010 |
| DE | 90 16 062 U1 | 2/1991 |
| DE | 91 05 132 U1 | 6/1991 |
| DE | 10019264 | 10/2001 |
| DE | 10260694 | 6/2004 |
| DE | 10 2006 009 923 | 9/2007 |
| EP | 0 712 09 A2 | 2/1983 |
| EP | 0 748 889 A2 | 12/1996 |
| EP | 0 876 524 A1 | 11/1998 |
| EP | 0 876 524 B1 | 10/2003 |
| EP | 1 630 145 A1 | 3/2006 |
| EP | 1 686 210 A1 | 11/2013 |
| JP | 04-327272 | 11/1992 |
| JP | 06-018099 | 1/1994 |
| JP | 06-048099 | 2/1994 |
| JP | 08-049143 | 2/1996 |
| RU | 2189421 | 9/2002 |
| RU | 624023 | 4/2007 |
| RU | 2592104 | 7/2016 |
| WO | WO-99/35434 A1 | 7/1999 |
| WO | WO-2005/052235 A1 | 6/2005 |
| WO | WO-2005/124063 A2 | 12/2005 |
| WO | WO-2007/144559 A2 | 12/2007 |
| WO | WO-2007/147062 | 12/2007 |
| WO | WO-2008/134604 A2 | 11/2008 |
| WO | WO-2009/115654 A1 | 9/2009 |
| WO | WO-2010/086618 A2 | 8/2010 |
| WO | WO-2013/067034 | 5/2013 |
| WO | WO-2017/079661 A1 | 5/2017 |
| WO | WO-2018/195088 A1 | 10/2018 |

OTHER PUBLICATIONS

Anderson et al., Manual of Ready-Mixed Concrete, 2nd Edition, CRC Press, 2003, ProQuest ebook central.

AU Examination Report for AU App. No. 2012332568, dated Apr. 29, 2016, 3 pages.

Celanese Acetate, Mesh definition, Complete Textile Glossary, 2001, 3 pages.

Communication pursuant to Rule 114(2) EPC for EP Application No. 12783816, dated Feb. 24, 2015, 4 pages.

Examination report No. 2 for AU App. No. 2017203289, dated Nov. 16, 2018, 4 pages.

International Search Report and Written Opinion for International App. No. PCT/US2018/027984, dated Jul. 5, 2018, 13 pages.

International Search Report and Written Opinion for International Application No. PCT/US2012/062831, dated Mar. 21, 2013, 11 pages.

International Search Report and Written Opinion for International Application No. PCT/US2016/060684, dated Feb. 10, 2017, 15 pages.

International Search Report and Written Opinion for PCT Application No. PCT/GB2007/001795, dated Nov. 30, 2007, 10 pages.

International Search Report and Written Opinion for PCT Application No. PCT/GB2010/000156, dated Oct. 28, 2010, 14 pages.

Particle Size Conversion Table, Sigma-Aldrich, Downloaded From Internet Jul. 10, 2017.

Powers, T.C.; "Structure and Physical Properties of Hardened Portland Cement Paste" Journal of the American Ceramic Society, vol. 41, No. 1, Jan. 1, 1958 (Year: 1958).

* cited by examiner

CEMENTITIOUS COMPOSITE CONSTITUENT RELATIONSHIPS

CROSS-REFERENCE TO RELATED PATENT APPLICATIONS

This application is a continuation of U.S. patent application Ser. No. 16/266,891, filed Feb. 4, 2019, which is a continuation of U.S. patent application Ser. No. 15/807,373, filed Nov. 8, 2017, both of which are incorporated herein by reference in their entireties. This application is also related to U.S. patent application Ser. No. 16/224,567, filed Dec. 12, 2018, which (i) is a continuation of U.S. patent application Ser. No. 15/061,389, filed Mar. 4, 2016, which is a continuation of U.S. patent application Ser. No. 14/933,898, filed Nov. 5, 2015, which is a continuation of U.S. patent application Ser. No. 14/185,610, filed Feb. 20, 2014, which claims the benefit of U.S. Provisional Patent Application No. 61/877,857, filed Sep. 13, 2013, and (ii) is a continuation-in-part of International Application No. PCT/US2012/062831, filed Oct. 31, 2012, which claims the benefit of U.S. Provisional Patent Application No. 61/554,377, filed Nov. 1, 2011, and U.S. Provisional Patent Application No. 61/703,618, filed Sep. 20, 2012, all of which are incorporated herein by reference in their entireties.

BACKGROUND

The present application relates to a cementitious composite for in-situ hydration (i.e., hydration in place, on location, on a construction site). In-situ hydration occurs as a liquid is topically applied and reacts with a volume of cementitious material within the cementitious composite. This reaction occurs while the cementitious composite is in a position and does not change the directional orientation of the pre-fabricated nature of the cementitious composite. Such a cementitious composite allows cementitious material to set and harden within the cementitious composite without requiring traditional mixing and pour procedures.

Textile-reinforced composites may include at least one layer of a two or three-dimensional textile and a layer of cementitious material to form a laminated composite, where traditionally the textiles are layered in a planer form. Such laminated composites may exhibit excellent in-plane properties but typically lack reinforcement in the thickness direction (i.e., a direction orthogonal to a surface of the composite) or have reduced bonding of the layers. While traditional cement composites may include plain weave fabrics or multiple layers of fabric to improve performance, these systems may fail (e.g., delaminate, etc.) under loading.

Other cementitious composites include "spacer fabric" composites having monofilament threads or yarns which are ideally elastomeric, woven between two layers to create a fabric with a spaced apart arrangement configured to entrap cementitious material between the two layers. The outer layers are each porous to allow the yarns, threads, etc. to be threaded through the outer layers, where the yarns, threads, etc. are fed through the pores of the layers. Additional, less porous fabrics or membranes may be attached to the outer layers of the spacer fabric to reduce the size of openings on each layer and prevent the cementitious material from escaping the composite. Adhesive may be required to attach the additional, less porous fabric layers. The yarns of the spacer fabric do not provide a structure to which other layers may be attached. The yarns must be woven between porous outer layers having apertures arranged in a set configuration designed for the yarn to thread though. Such spacer fabric cementitious composites are labor intensive to manufacture.

SUMMARY

One embodiment relates to a cementitious composite for in-situ hydration. The cementitious composite includes a first layer, a second layer spaced from the first layer, and a cementitious mixture disposed between the first layer and the second layer. The cementitious mixture includes cementitious materials and a viscosity modifier. The cementitious materials are shaped and arranged to provide a void fraction between 0.64 and 1.35. The void fraction is defined as the ratio of the volume of the voids within the cementitious mixture per unit area of the cementitious composite to the volume of the cementitious materials per unit area of the cementitious composite. The cementitious mixture is configured to absorb a mass of water that provides a maximum 28 day compressive strength of the cementitious composite. $M_w = x \cdot M_c$ where $M_w$ is the mass of the water per unit area of the cementitious composite, $M_c$ is a mass of the cementitious materials of the cementitious mixture per unit area of the cementitious composite, and x is a ratio of the mass of the water relative to the mass of the cementitious materials of the cementitious mixture per unit area of the cementitious composite that provides the maximum 28 day compressive strength of the cementitious composite. x is between 0.25 and 0.55.

Another embodiment relates to a cementitious composite. The cementitious composite includes a first layer, a second layer spaced from the first layer, and a cementitious mixture disposed between the first layer and the second layer. The cementitious mixture includes cementitious materials and an accelerator. The cementitious materials are shaped and arranged to provide a void fraction between 0.64 and 1.35. The void fraction is defined as the ratio of the volume of the voids within the cementitious mixture per unit area of the cementitious composite to the volume of the cementitious materials per unit area of the cementitious composite. The cementitious mixture is configured to absorb a mass of water that provides a maximum 28 day compressive strength of the cementitious composite. $M_w = x \cdot M_c$ where $M_w$ is the mass of the water per unit area of the cementitious composite, $M_c$ is a mass of the cementitious materials of the cementitious mixture per unit area of the cementitious composite, and x is a ratio of the mass of the water relative to the mass of the cementitious materials of the cementitious mixture per unit area of the cementitious composite that provides the maximum 28 day compressive strength of the cementitious composite. x is between 0.25 and 0.55.

Still another embodiment relates to a cementitious composite for in-situ hydration. The cementitious composite includes a first layer, a second layer spaced from the first layer, and a cementitious mixture disposed between the first layer and the second layer. The first layer is water soluble, dissolvable, biodegradable, or removable. The cementitious mixture includes cementitious materials. The cementitious materials are shaped and arranged to provide a void fraction between 0.64 and 1.35. The void fraction is defined as the ratio of the volume of the voids within the cementitious mixture per unit area of the cementitious composite to the volume of the cementitious materials per unit area of the cementitious composite. The cementitious mixture is configured to absorb a mass of water that provides a maximum 28 day compressive strength of the cementitious composite. $M_w = x \cdot M_c$ where $M_w$ is the mass of the water per unit area of the cementitious composite, $M_c$ is a mass of the cementitious materials of the cementitious mixture per unit area of the cementitious composite, and x is a ratio of the mass of the water relative to the mass of the cementitious materials of the cementitious mixture per unit area of the cementitious composite that provides the maximum 28 day compressive strength of the cementitious composite. x is between 0.25 and 0.55.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description taken in conjunction with the accompanying drawings wherein like reference numerals refer to like elements, in which.

DETAILED DESCRIPTION

Figure 1:
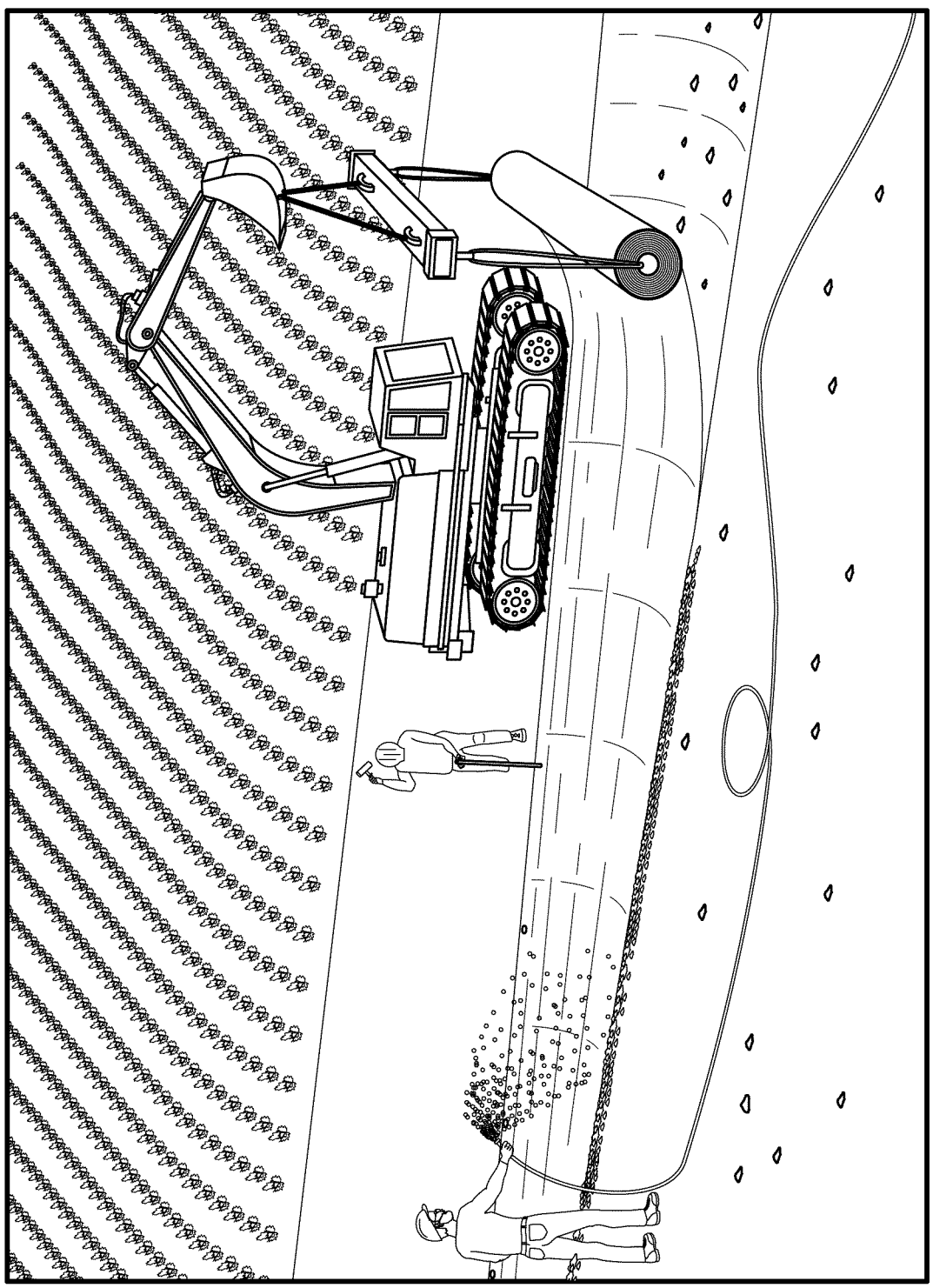
FIG. 1 is a perspective view of operators installing a cementitious composite in a canal lining application, according to an exemplary embodiment.

Before turning to the figures which illustrate the exemplary embodiments in detail, it should be understood that the application may be not limited to the details or methodology set forth in the description or illustrated in the figures. It should also be understood that the terminology may be for the purpose of description only, and should not be regarded as limiting.

Composite Layers

Cementitious composite mats may provide enhanced structural performance relative to concrete reinforced with traditional materials (e.g., fibers, rebar, etc.), traditional unidirectional textile reinforced concrete composites, and woven or knitted three-dimensional textile concrete composites. Cementitious composite mats may include a dry cementitious mixture embedded in, and/or contained by, a structural layer. The structural layer may be positioned between an impermeable layer and a permeable layer. The cementitious mixture undergoes its normal setting and strength gain process after in-situ hydration to produce a rigid composite. The permeable layer may hold water (e.g., for a controlled period of time, etc.) for improved curing of the cementitious composite mat (e.g., facilitating the release of water into the cementitious mixture over a period of time, etc.). Unlike traditional concrete, cementitious composite mats do not require the cementitious portion to be mixed (e.g., in a standalone mixer, in a cement mixer truck, etc.). The cementitious mixture of the present application does not wash from the cementitious composite mat as easily (e.g., not at all, etc.) as traditional, non-formulated cementitious mixtures and remains secured within the cementitious composite mat such that it hardens in place without needing to be mixed. The cementitious mixture is disposed between the permeable and impermeable layers and may include accelerators, retarders, latex modifiers, curing modifiers, other modifiers, fibers, glass additives, metal additives, stone additives, organic additives, water reducing admixtures, shrinkage reducing admixtures, viscosity modifiers, absorbent materials (e.g., superabsorbent materials, superabsorbent polymers, superabsorbent clays, etc.), interconnection particles (e.g., beads, pellets, strands, etc.; made of a resin, a polymer, elastomeric polymer, PVC, polypropylene, polyethylene, a metal or metal alloy having a low melting point, etc.), adhesives, and/or other gel forming additives so the cementitious mixture remains stationary when hydrated. A cementitious mixture that remains stationary facilitates using a top layer (e.g., permeable layer, etc.) that dissolves upon hydration and/or that has apertures.

The structural layer of the cementitious composite mat may be formed into, or include an independent, free-standing material (e.g., the structural layer, etc.). The structure layer may improve load bearing capabilities of the cementitious composite mat by distributing the energy of a load across the structural layer. The structure layer may also bridge crack faces in the cementitious phase to provide improved crack resistance and/or localize cracking to reduce crack propagation. The structural layer may be coupled to at least one of the permeable layer and the impermeable layer with an adhesive, a heat treatment process, and/or mechanically (e.g., barbs, fibers, etc.). In some embodiments, the structural layer is at least partially manufactured from an adhesive material. In some embodiments, the cementitious composite does not include the structural layer, but rather the adhesive layer functions as a structural layer. Cementitious composite mats having the structural layer may provide improved structural performance per unit of volume, have a lower cost, reduce labor costs, require less processing than other concrete or concrete composite, reduce the possibility of variation in specification compared to poured concrete, and/or eliminate the disadvantages of traditional wet mixing (e.g., range constraints for delivery with a concrete mixer vehicle, etc.), among having other advantages. In addition to holding the cementitious composite mat together and/or retaining the cementitious mixture (e.g., pre-hydration, etc.), the structural layer may structurally reinforce the cementitious layer and/or cementitious composite mat post-hydration.

Hydration of cementitious composite mats may be initiated in-situ (e.g., in place, on a job site, etc.). The cementitious composite mat may be transported to a location (e.g., canal, etc.) as a flexible composite material in a pre-packaged configuration (e.g., sheets, rolls, etc.) and hydrated on-location. Such cementitious composite materials may provide commercial, water conservation, and operational benefits. By way of example, cementitious composite mats may be applied to form a canal lining, as shown in FIG. 1. Other applications for cementitious composite mats may include the following: low to high flow channels, open-channel water conveyance canals, irrigation and drainage ditches, swales, culverts, jetties, groins, dikes, levees, reservoirs, check dams, interceptor ditches, horizontal drains, stream restoration and storm water management, seawall and bulkhead scour protection, landfill layering and capping, brown field layering and capping, mine shaft reinforcement, structural reinforcement, airfield or helipad construction, boat launch ramps, column and beam reinforcement, pipe repair, oilfield lining, holding basins, pond lining, pit lining, waste water lagoon lining, slope fortification, snow basin fortification, tieback fortification, berm lining, beach and shoreline restoration, as a road surface, driveways, sidewalks and walkways, form work lining, concrete waterproofing, a material for homes or other structures, landscaping, foundation linings, flooring, pool construction, patio construction, roofs, insulation and weatherproofing, as a replacement for stucco, for noise attenuation, and for retaining wall and embankment construction, among other applications.

Figure 2:
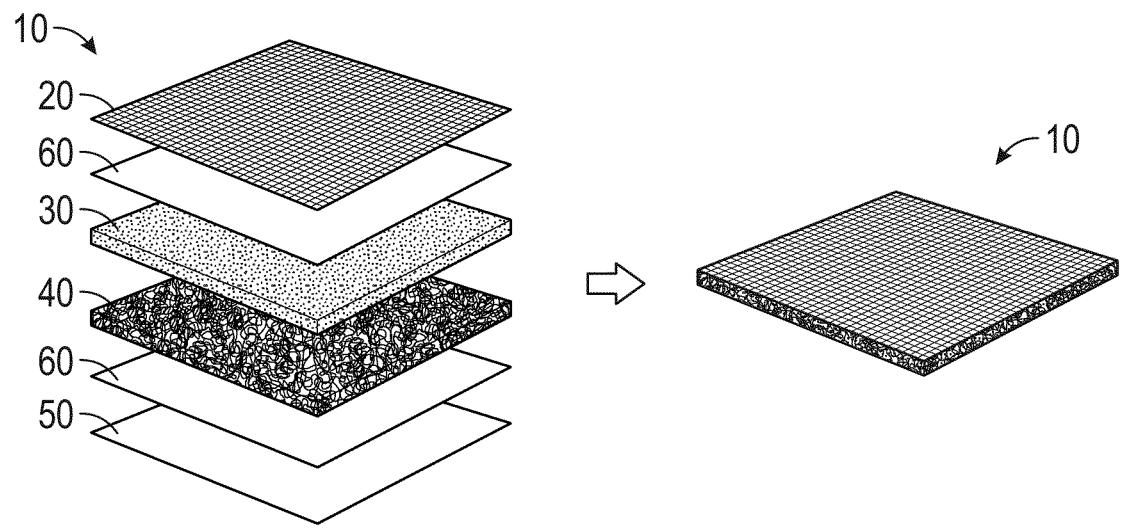
FIG. 2 is an exploded perspective view of a cementitious composite, according to an exemplary embodiment.

According to the exemplary embodiment shown in FIG. 2, a composite mat, shown as cementitious composite 10, includes a plurality of layers. As shown in FIG. 2, such layers include a containment layer, shown as permeable layer 20; a cementitious layer, shown as cementitious mixture 30; a three-dimensional volume layer (e.g., a bunching layer, a mesh layer, a grid layer, a nonwoven layer, a not woven layer, a nonfibrous layer, a fiberless layer, pins and/or connectors, interconnecting particle layer, a coiled layer, a tube layer, a 3D knitted and/or woven layer, a plastic layer, a metal layer, a layer configured for integration with one or more snap-fit connections, etc.), shown as structure layer 40; an impermeable (e.g., sealing, etc.) layer, shown as impermeable layer 50; and one or more adhesive layers, shown as adhesive layer 60. According to an exemplary embodiment, permeable layer 20, cementitious mixture 30, structure layer 40, impermeable layer 50, and/or adhesive layer 60 are disposed adjacent to one another and assembled into a sheet to form cementitious composite 10. As shown in FIG. 2, structure layer 40 may be disposed between (e.g., sandwiched between, etc.) permeable layer 20, impermeable layer 50, and adhesive layer 60. In some embodiments, the cementitious composite 10 does not include structure layer 40. In such embodiments, adhesive layer 60 may function as a structure layer. According to an exemplary embodiment, cementitious composite 10 has a thickness of between five millimeters and one hundred millimeters pre-hydration. The thickness of cementitious composite 10 may exceed the pre-hydration thickness after hydration when, by way of example, additives are included in cementitious mixture 30 (e.g., expansive cement, etc.). It should be understood that reference to a structure layer, an adhesive layer, and/or a cementitious mixture may include any structure layer, adhesive layer, and/or cementitious mixture disclosed herein.

According to an exemplary embodiment, cementitious composite 10 includes layers that are coupled together. Such coupling may reduce the relative movement between the layers pre-hydration (e.g., during the manufacturing process, during transportation, during installation, etc.). By way of example, impermeable layer 50 may be coupled (e.g., selectively joined, etc.) with structure layer 40 and/or cementitious mixture 30 with adhesive layer 60. By way of another example, permeable layer 20 may be coupled (e.g., selectively joined, etc.) with structure layer 40 and/or cementitious mixture 30 with adhesive layer 60. Such coupling may improve the structural characteristics of cementitious composite 10 by facilitating load transfer between permeable layer 20, structure layer 40, adhesive layer 60, and/or impermeable layer 50. Adhesive layer 60 and/or structure layer 40 may serve as a bonding medium. Various structure layers and/or adhesive layers may reduce the risk of delamination.

According to various embodiments, cementitious composite 10 includes a different combination of layers. By way of example, cementitious composite 10 may include impermeable layer 50, structure layer 40, adhesive layer 60, cementitious mixture 30, and/or permeable layer 20. Such a composite may utilize the structure layer 40 and/or the adhesive layer 60 to hold cementitious mixture 30, may include a removable layer to retain cementitious mixture 30 during transport and in the application of cementitious composite 10, and/or may include another system designed to retain cementitious mixture 30. According to various alternative embodiments, cementitious composite 10 includes permeable layer 20 and impermeable layer 50, only impermeable layer 50, only permeable layer 20, or neither permeable layer 20 nor impermeable layer 50. By way of example, cementitious composite 10 may include impermeable layer 50, structure layer 40, adhesive layer 60, cementitious mixture 30, and permeable layer 20. By way of another example, cementitious composite 10 may include impermeable layer 50, structure layer 40, adhesive layer 60, and cementitious mixture 30. By way of yet another example, cementitious composite 10 may include impermeable layer 50, adhesive layer 60, cementitious mixture 30, and permeable layer 20. By way of still another example, the cementitious composite 10 may include impermeable layer 50 and adhesive layer 60, and cementitious mixture 30 may be introduced thereon on-site (e.g., cementitious mixture 30 may be scattered, laid, embedded, etc. across, in, and/or along impermeable layer 50 on-site and prior to in-situ hydration, etc.). Further, impermeable layer 50 may have one or more surface imperfections and/or a roughness (e.g., fibers, members, barbs, etc.) that are configured to facilitate holding cementitious mixture 30 prior to and/or after hydration, attach to the hardened concrete, and/or be embedded within the hardened concrete.

Figure 3:
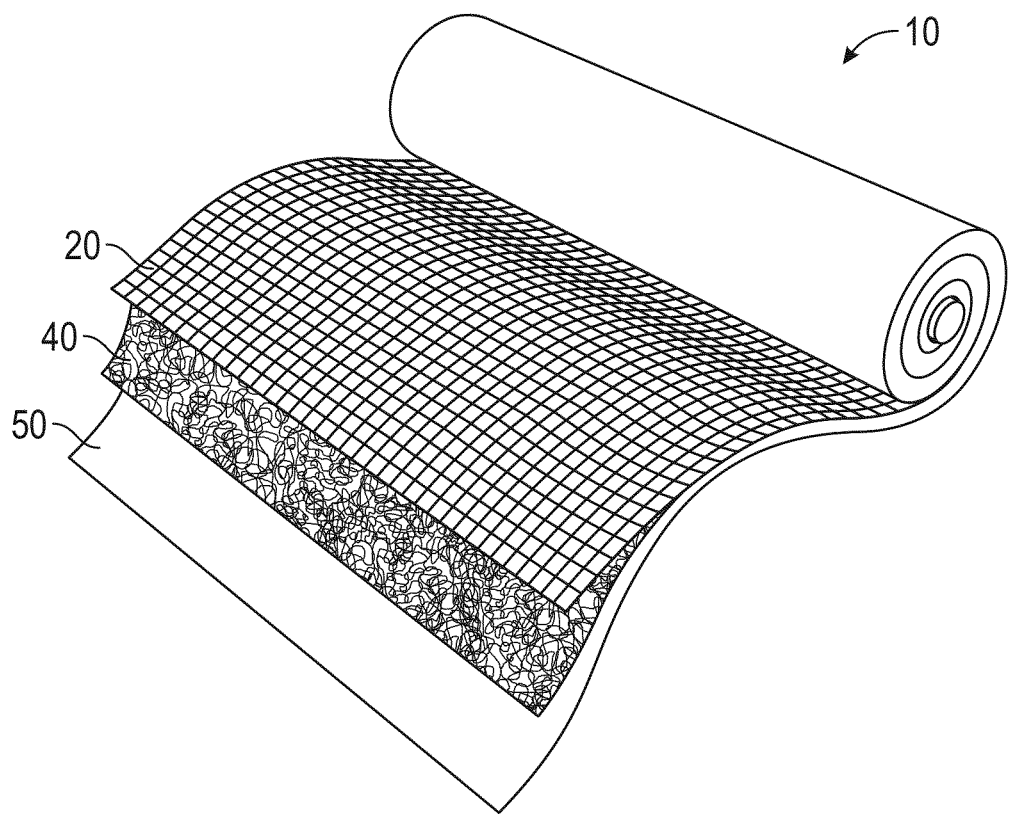
FIG. 3 is a perspective view of a rolled cementitious composite, according to an exemplary embodiment.

Referring next to the exemplary embodiment shown in FIG. 3, cementitious composite 10 may be arranged into a flexible sheet. As shown in FIG. 3, permeable layer 20, structure layer 40, and impermeable layer 50 are each flexible and disposed adjacent to one another. According to an exemplary embodiment, such a combination of flexible layers facilitates rolling cementitious composite 10 to facilitate transportation and reduce the amount of cementitious mixture 30 that migrates through permeable layer 20. According to an alternative embodiment, cementitious composite 10 may be arranged in another configuration (e.g., various sheets that may be stacked, a sheet having a preformed shape, etc.).

Structure Layer

Structure layer 40 may include low density, high void space, and discontinuities, among other characteristics. In one embodiment, structure layer 40 is an independent, structural material configured to support the weight of cementitious mixture 30, thereby reducing the risk of pre-hydration delamination (e.g., separation of structure layer 40 from impermeable layer 50, from permeable layer 20, from adhesive layer 60, etc.), while improving the strength of the cementitious composite 10 post-hydration. By way of example, structure layer 40 may be configured to independently support a cementitious mix having a weight of between one and five pounds per square foot. These characteristics improve the strength and transportability, among other features, of cementitious composite 10. Structure layer 40 may also reduce the prevalence and/or severity of shrink-induced cracking within cementitious mixture 30. Such a reduction may be produced because structure layer 40 limits crack propagation by bridging crack faces within the cementitious phase.

According to an exemplary embodiment, structure layer 40 is flexible. In other embodiments, structure layer 40 is semi-rigid. By way of example, structure layer 40 may have a predefined shape (e.g., curved, etc.) such that cementitious composite 10 takes the shape of structure layer 40. In some embodiments, structure layer 40 is deformable (e.g., plastically deformable, etc.). According to an exemplary embodiment, structure layer 40 includes at least one of a natural material (e.g., coconut fiber, cellulose fiber, other natural materials, etc.), a synthetic material (e.g., aramid glass, etc.), a polymeric material, (e.g., plastic, nylon, polypropylene, etc.), a metallic material (e.g., metal, aluminum oxide, etc.), and a composite material (e.g., carbon fiber, silicon carbide, etc.).

According to an exemplary embodiment, structure layer 40 may have independent mechanical properties apart from those of the other layers of cementitious composite 10. By way of example, such mechanical properties may include tensile strength, elongation at break, and tear strength, among other known properties. Structure layer 40 may have portions with a target thickness, length, and/or coupling designed to provide target mechanical properties. Structure layer 40 may have a composition that provides a target mechanical property. The modulus of elasticity and geometry of structure layer 40 may affect the flexibility of cementitious composite 10. A structure layer 40 having one of a lower modulus of elasticity or more open geometry may increase the pliability (e.g., lower radius of curvature, etc.) of cementitious composite 10 (e.g., for shipping, to contain cementitious mixture 30, etc.).

According to an alternative embodiment, structure layer 40 includes void patterns (e.g., shapes cut through structure layer 40, three dimensional voids formed within structure layer 40, etc.). Such void patterns may be formed in structure layer 40 through cutting, forming, or another process. The void patterns may be formed during the primary manufacturing of structure layer 40 or subsequently as a secondary manufacturing process. According to an exemplary embodiment, the void patterns are randomly distributed or formed in sequence (e.g., a honeycomb, etc.). The void patterns may decrease the time required to dispose cementitious mixture 30 in structure layer 40, improve the physical properties of cementitious composite 10 after in-situ hydration, and/or provide other advantages.

According to an alternative embodiment, a coating may be disposed around and/or along at least a portion of structure layer 40. By way of example, the coating may be configured to improve various properties (e.g., strength, durability, etc.) of structure layer 40. As still a further example, the coating may improve the coupling strength of portions within structure layer 40, of structure layer 40 to permeable layer 20, impermeable layer 50, and/or adhesive layer 60, and of structure layer 40 to cementitious mixture 30 after in-situ hydration. By way of example, the coating may include an abrasive coating (e.g., similar to that provided with a Scotch-Brite® scouring pad, etc.), a coating to provide resistance to ultraviolet light, a coating to protect structure layer 40 from cementitious mixture 30 (e.g., improved alkaline resistance, improved bonding to cementitious mixture 30 post-hydration, to reduce delamination and/or detachment from set cementitious mixture 30, etc.), and/or still another known coating.

In some embodiments, cementitious composite 10 includes a scrim lining (e.g., a mesh reinforcing material, a grid reinforcing material, a geotextile, a geogrid, a nonwoven material, a woven material, etc.) coupled to (e.g., fused, integrally formed, joined, etc.) structure layer 40. A scrim lining may be coupled to one or more surfaces of structure layer 40 or disposed within structure layer 40. By way of example, the scrim lining may be disposed along a top surface (e.g., the topmost, etc.) of structure layer 40, disposed along a bottom surface (e.g., the bottommost, etc.) of structure layer 40, disposed within a middle portion of structure layer 40, disposed along an edge of structure layer 40, extending diagonally within structure layer 40, etc. The scrim lining may be a similar material as permeable layer 20 to improve bonding between permeable layer 20 and structure layer 40 (e.g., when the scrim is disposed along the bonding interface, etc.). The scrim lining may improve the tensile strength of structure layer 40 and cementitious composite 10 both before and after in-situ hydration. By way of example, a loosely assembled structure layer 40 may have a tendency to separate, and a scrim lining may reinforce structure layer 40 to prevent such separation. The scrim lining may decrease the risk of delamination of permeable layer 20 and/or impermeable layer 50 therefrom (e.g., when the scrim lining is positioned on the top and/or the bottom of structure layer 40, etc.).

According to various exemplary embodiments, structure layer 40 may include one or more of: a bunching layer, a mesh layer, a grid layer, a nonwoven layer, a not woven layer, a nonfibrous layer, a fiberless layer, pins and/or connectors, an interconnecting particle layer, a coiled layer, a tube layer, a 3D knitted and/or woven layer, a plastic layer, a metal layer, and/or a layer configured for integration with one or more snap-fit connections.

Cementitious Mixture

Figure 4:
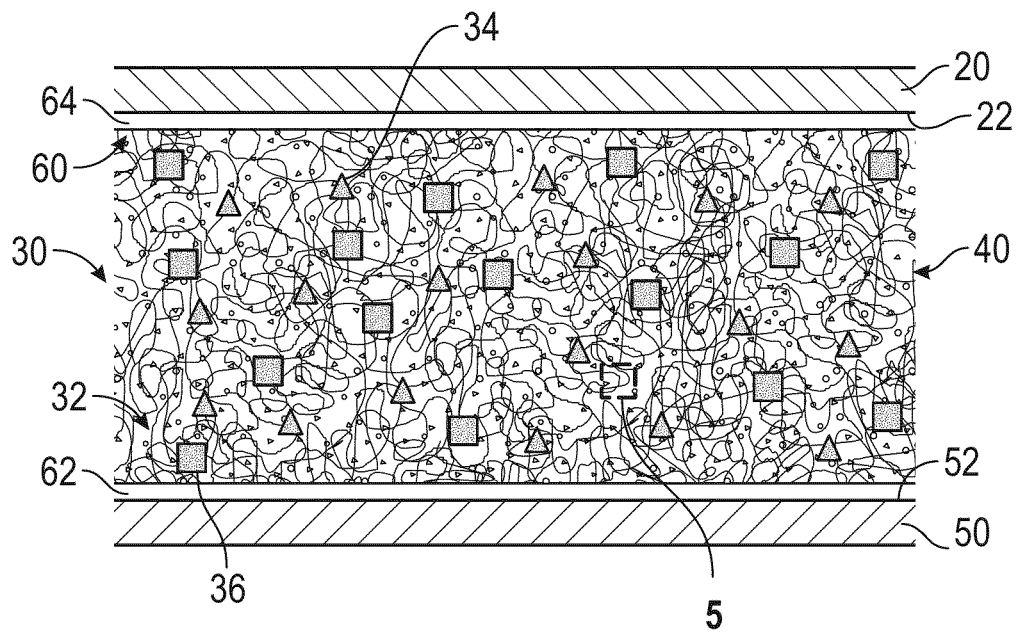
FIG. 4 is a schematic cross-sectional view of the cementitious composite of FIG. 2, according to an exemplary embodiment.
Figure 5:
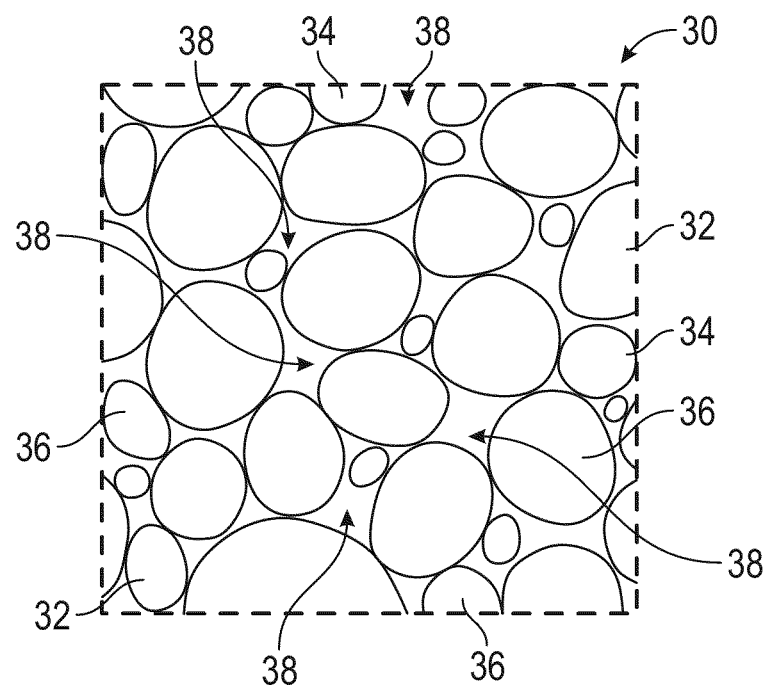
FIG. 5 is a detailed view of a cementitious mixture within the cementitious composite of FIG. 4, according to an exemplary embodiment.

According to the exemplary embodiment shown in FIGS. 4 and 5, cementitious mixture 30 is disposed within at least a portion of structure layer 40 and/or adhesive layer 60. As shown in FIGS. 4 and 5, cementitious mixture 30 includes a mixture of constituents (e.g., materials, etc.), shown as cementitious materials 32. Cementitious materials 32 may include cement (e.g., Portland cement, Alumina cement, CSA cement, etc.) and/or supplementary cementitious materials (e.g., fly ash, silica fume, slag, metakaolin, other supplementary materials, etc.). Cementitious mixture 30 may further include aggregate materials or other filler particles (e.g., fine aggregates, coarse aggregates, sand, limestone, non-absorbent materials, etc.), shown as aggregates 34. In one embodiment, aggregates 34 are uniformly (e.g., evenly, etc.) distributed throughout cementitious mixture 30. In other embodiments, aggregates 34 are non-uniformly (e.g., randomly, unevenly, etc.) distributed throughout cementitious mixture 30. Aggregates 34 may have sizes between greater than thirty mesh (i.e., 595 microns) and less than five mesh (i.e., 4000 microns). In some embodiments, aggregates 34 have sizes between three-hundred mesh (i.e., 50 microns) and thirty mesh. The size of aggregates 34 may be selected to create a desired size and amount of void space within cementitious mixture 30. The size and amount of void space within cementitious mixture 30 may directly affect water flow during in-situ hydration of cementitious composite 10.

In some embodiments, cementitious mixture 30 includes additives (e.g., fibers, plasticizers, accelerators, retarders, viscosity modifiers, absorbers, water reducers, etc.). Such additives may be used to improve the mechanical properties (e.g., strength, setting time, curing requirements, thermal coefficient of expansion, permeability, acid resistance, etc.) or durability, among other characteristics, of the cementitious mixture 30 and/or may be used as a substitute for a portion of cementitious materials 32. According to an exemplary embodiment, the additives include a pozzolonic material (e.g., fly ash, bottom ash, silica fume, slag, metakaolin, etc.) added at a specified mix ratio.

As shown in FIGS. 4 and 5, cementitious mixture 30 includes an absorbent material, shown as absorbent material 36. According to an exemplary embodiment, absorbent material 36 is configured to absorb water and expand during in-situ hydration to lock cementitious materials 32 and/or aggregates 34 in place (e.g., increases the stability and/or viscosity of cementitious mixture 30 within structure layer 40, adhesive layer 60, etc.) to prevent washout of cementitious mixture 30 from cementitious composite 10 during hydration. Absorbent material 36 may thereby facilitate applying and topically hydrating cementitious composite 10 on slopes (e.g., hillsides, ditches, etc.) without the risk of washing out cementitious mixture 30 from the structure layer during hydration. Absorbent material 36 may additionally or alternatively improve curing of cementitious composite 10 by providing or releasing water from within cementitious mixture 30 during the curing process. Improving the curing of cementitious composite 10 may improve (e.g., increase, maximize, etc.) the strength thereof (e.g., up to double that of a cementitious composite having a mix that does not include absorbent material, etc.). Absorbent material 36 may additionally or alternatively improve one or more post-hydration and post-cure properties of cementitious composite 10 (e.g., abrasion resistance, flexural strength, puncture strength, compressive strength, etc.). Absorbent material 36 may additionally or alternatively hold water to reduce evaporation, release water over a period of time, and/or control the water to cement ratio.

According to an exemplary embodiment, cementitious mixture 30 includes approximately 0.001-5% (e.g., by weight, by volume, etc. of cementitious mixture 30) of absorbent material 36. Absorbent material 36 may include particles, pellets, powder, fiber, a membrane, microbeads, etc. In some embodiments, absorbent material 36 includes an absorbent material configured to absorb between 0.001 and 1 times its weight in water. In some embodiments, absorbent material 36 includes a superabsorbent material configured to absorb between 1 and 1000 times its weight in water. In one embodiment, the superabsorbent material is configured to absorb between 75 and 300 times its weight in water, for example approximately 200 times its weight in water. The superabsorbent material may include a superabsorbent polymer (SAP). The SAP may include sodium polyacrylate, poly-acrylic acid sodium salt, polyacrylamide copolymer, ethylenemaleic anhydride copolymer, cross-linked carboxymethylcellulose, polyvinyl alcohol copolymers, cross-linked polyethylene oxide, and/or starch grafted copolymer of polyacrylonitrile, among other possible SAPs. The superabsorbent material may additionally or alternatively include a superabsorbent clay (e.g., to form a SAP composite (SAPC), etc.). The superabsorbent clay may include montmorillonite and/or other substances used to create a SAPC.

According to an exemplary embodiment, absorbent material 36 has a particle size that may range from 1 micron to 5000 microns. In one embodiment, the majority of absorbent material 36 has a particle size between 90 microns and 300 microns at a specified mix ratio. By way of example, the specified mix ratio of absorbent material 36 may include 0-30% of particles having a size less than 90 microns (e.g., approximately 7%, etc.), 10-60% of particles having a size between 90-150 microns (e.g., approximately 37%, etc.), 25-80% of particles having a size between 150-300 microns (e.g., approximately 56%, etc.), and 0-30% of particles having a size greater than 300 microns (e.g., approximately 0%, etc.). Applicant has discovered that larger particles of absorbent material 36 (e.g., particles having a size greater than 150 microns, etc.) provide improved washout resistance relative to smaller particles of absorbent material 36 (e.g., particles less than 150 microns, etc.). By way of example, the larger particles may absorb water more quickly and form a gel-like substance during and/or post-hydration that locks cementitious materials 32 and aggregates 34 within structure layer 40 and/or adhesive layer 60 of cementitious composite 10 to prevent washout thereof. Quicker absorption of water may be advantageous as cementitious composite 10 may be topically hydrated quickly, on a slope, and/or at a relatively high pressure. Applicant has also discovered that the smaller particles of absorbent material 36 improve the curing process of cementitious composite 10 (e.g., increasing the strength thereof, etc.). Applicant has also discovered that smaller particles create a finer, less abrasive material after hydration with lower permeability.

In some embodiments, cementitious mixture 30 includes lime (e.g., hydrated lime, etc.). By way of example, cementitious mixture 30 may include absorbent material 36, lime, or both absorbent material 36 and lime. Applicant has discovered that lime stiffens and sets quickly (e.g., almost instantaneously with the proper mix ratios of lime) relative to one or more other constituents of cementitious mixture 30. Applicant has further discovered that the quick-setting lime locks one or more of the other constituents of cementitious mixture 30 in place, thereby reducing washout of cementitious mixture 30 during hydration. According to an exemplary embodiment, cementitious mixture 30 includes approximately 0.01 to greater than 30% (e.g., by weight of cementitious mixture 30) of lime. In one embodiment, cementitious mixture 30 includes approximately 2-5% (e.g., by weight of cementitious mixture 30) of lime.

In some embodiments (e.g., embodiments in which cementitious mixture includes lime, etc.), cementitious mixture 30 includes fibers (e.g., fine fibers, etc.). In other embodiments, fibers may be used in combination with the absorbent material 36 in cementitious mixture 30 without the addition of lime. The fibers may advantageously reduce cracking of cementitious composite 10. According to an exemplary embodiment, cementitious mixture 30 includes fibers having sizes between 0.05 millimeters (mm) and 20 mm. Applicant has discovered that fibers sized less than 1 mm have the greatest impact on crack prevention. According to an exemplary embodiment, cementitious mixture 30 includes approximately 0.05-2.5% (e.g., by weight of cementitious mixture 30) of fibers. In other embodiments, cementitious mixture 30 has a greater or lesser amount of fibers. The fibers may be manufactured from a synthetic material (e.g., polypropylene, polyethylene, nylon, glass, polyester, acrylic, aramid, etc.) and/or natural material (e.g., cellulose fiber, coconut fiber, grass, etc.). The fibers may be a monofilament, fibrillated, and/or have another structure. According to an exemplary embodiment, cementitious mixture 30 having lime, fibers, and/or absorbent material 36 provides improved performance of cementitious composite 10 in terms of increased washout prevention, decreased cracking, improved curing, increased strength (e.g., ultimate strength, flexural strength, puncture strength, compressive strength, etc.), etc.

In some embodiments, an adhesive (e.g., a liquid adhesive, a gel adhesive, etc.) is mixed with other constituents of cementitious mixture 30. By way of example, the adhesive may facilitate forming (as part of cementitious mixture 30) a tacky layer to which impermeable layer 50 and/or permeable layer 20 may be attached. The tacky layer may be between one tenth and four inches thick. Impermeable layer 50 and/or permeable layer 20 may be coupled along top and/or bottom sides of cementitious mixture 30 with the adhesive. In one embodiment, the adhesive is water permeable. In other embodiments, the adhesive is removed (e.g., heated off, etc.) and/or cured to facilitate hydration of the cementitious particles of cementitious mixture 30 before or after impermeable layer 50 and/or permeable layer 20 are attached. By way of example, 50, 80, or 95 percent (e.g., by area, by volume, by weight, etc.) of the adhesive may be removed and/or cured to facilitate hydration.

According to an exemplary embodiment, the sizes of aggregates 34, the size of cementitious materials 32, the size of absorbent material 26, the size of other additives (e.g., lime, fibers, accelerators, retarders, adhesive, etc.), and/or amount of compaction of cementitious mixture 30 are selected to create a desired size and/or amount of void space, shown as voids 38, within cementitious mixture 30. The size and amount of voids 38 within cementitious mixture 30 may directly affect water flow during in-situ hydration of cementitious composite 10.

According to an exemplary embodiment, the materials of cementitious mixture 30 are mixed together and thereafter disposed along or between impermeable layer 50, adhesive layer 60, and/or permeable layer 20. In one embodiment, cementitious mixture 30 is positioned within voids of structure layer 40 and/or adhesive layer 60 using gravity, vibration, and/or compaction. Cementitious mixture 30 may be disposed into structure layer 40 and/or adhesive layer 60, and along impermeable layer 50 with a uniform thickness (e.g., 0.25", 0.5", 0.75", etc.). In some embodiments, permeable layer 20 is disposed along cementitious mixture 30 before compaction such that cementitious mixture 30 is compressed between permeable layer 20 and impermeable layer 50. The compression may be applied to facilitate even distribution of the constituents (e.g., absorbent material 36, aggregates 34, cementitious materials 32, additives, etc.) within cementitious mixture 30 and/or affect the sizing of the voids 38 within cementitious mixture 30. Compaction may be facilitated or replaced with vibration. The compression may also increase the structural performance of the cementitious mixture 30 post-hydration. The extent that cementitious mixture 30 is compacted may impact the risk of cementitious mixture 30 washing out from cementitious composite 10 (e.g., reduce the risk of washout, etc.), the ability of water to flow through cementitious mixture 30, the time required for hydration, setting, and hardening of cementitious mixture 30, the strength of cementitious composite 10, and/or the risk of cementitious materials 32, aggregates 34, and/or absorbent materials 36 migrating out of cementitious composite 10. In some embodiments, an absorbent material (e.g., absorbent material 36, etc.) is additionally or alternatively coupled to, sprayed onto, bonded to, and/or otherwise attached to (e.g., integrally formed with, etc.) permeable layer 20, structure layer 40, adhesive layer 60, and/or impermeable layer 50. The absorbent material may improve (e.g., further improve, etc.) curing of cementitious mixture 30.

According to an exemplary embodiment, cementitious mixture 30 includes materials (e.g., cementitious materials 32, etc.) that set and harden once exposed to a fluid (e.g., water, etc.) through a hydration process. According to an exemplary embodiment, cementitious mixture 30 is disposed and/or compressed between permeable layer 20 and impermeable layer 50, and undergoes a normal setting and hardening process after in-situ hydration. The setting process may begin once cementitious mixture 30 interacts with a fluid (e.g., water, etc.). Such hydration and setting processes change cementitious mixture 30 from a flexible to a rigid material. While setting produces a rigid material, curing may improve the strength of cementitious composite 10. According to an exemplary embodiment, cementitious mixture 30 has a compressive strength of up to ten thousand or more pounds per square inch. According to an alternative embodiment, cementitious mixture 30 is modified with high performance cementitious ingredients and additives to achieve strength values in excess of ten thousand pounds per square inch.

According to an exemplary embodiment, water is added to cementitious mixture 30 to initiate the hydration processes. An operator may topically apply water to the surface of cementitious composite 10 in-situ to hydrate cementitious mixture 30. In some embodiments, cementitious composite 10 accommodates hydration even when positioned on a horizontal, positioned at an angle, or positioned over a curved surface without undermining the strength of cementitious composite 10. According to an exemplary embodiment, cementitious composite 10 may be hydrated even if positioned at up to a 90 degree angle relative to level. In these or other embodiments, cementitious mixture 30 may set without segregating from cementitious composite 10. In embodiments where permeable layer 20 does not dissolve quickly, cementitious composite 10 may be hydrated in an inverted position. By way of example, cementitious composite 10 may be implemented in a tunnel application where the cementitious composite 10 is used to form the walls and/or ceiling of the tunnel.

The characteristics of the hydrated cementitious composite 10 may be affected by at least one of (i) the particle size of absorbent material 36, aggregates 34, and/or cementitious materials 32 of cementitious mixture 30, (ii) the characteristics of adhesive layer 60 (e.g., structure, type, etc.), and (iii) the size, shape, diameter, material composition, pattern, structure (e.g., bunching, nonwoven, not woven, grid, interconnecting particles, connectors, etc.) of structure layer 40. By way of example, particle size and density may affect the homogeneity of cementitious mixture 30 thereby impacting various properties (e.g., strength, flexibility, etc.) of cementitious composite 10. According to an exemplary embodiment, cementitious materials 32 of cementitious mixture 30 have an approximately equal particle size (e.g., within 150 microns, etc.). According to an alternative embodiment, cementitious materials 32 of cementitious mixture 30 may have different sizes (e.g., a variation of more than 150 microns, etc.) that vary between 0.5 and 450 microns. A cementitious mixture 30 having differentially-sized particles may improve packing and reduce open space (i.e., voids 38) within cementitious mixture 30.

According to an exemplary embodiment, cementitious mixture 30 is cured using an external curing process. By way of example, such external curing may include water ponding. According to various alternative embodiments, the external curing process includes water spraying, wet burlap, sheeting, curing compounds, absorbent sands, and accelerated curing, among other known methods. In some embodiments, permeable layer 20 is formed of a hydrophilic material (e.g., paper, cellulose based materials, etc.) that may improve curing by holding water to prolong exposure of cementitious mixture 30 to a fluid. In some embodiments, permeable layer 20 includes a water soluble material which holds water and only dissolves with warm or hot water (e.g., greater than 70, 80, 90, 100, 110, 120, 130, etc. degrees Fahrenheit, etc.). Such a permeable layer 20 may thereby hold water for a desired period of time while hydrating cementitious mixture 30 and may thereafter be removed (e.g., disintegrated, detached, etc.) using warm or hot water. According to an alternative embodiment, permeable layer 20 is formed of a coating material having fewer apertures to improve curing by reducing the evaporation of water from cementitious mixture 30.

According to still another alternative embodiment, cementitious mixture 30 is cured using an internal curing process. According to an exemplary embodiment, cementitious mixture 30 is cured using internal water curing where cementitious mixture 30 includes a component that serves as a curing agent to the cementitious mixture. Such a component may include either absorbent material 36, an aggregate, or a new component (e.g. an additive, superabsorbent polymer, special aggregate, etc.) introduced into cementitious mixture 30 during the manufacturing process. Further, hydrophilic additives (e.g., absorbent material 36, superabsorbent polymers, etc.) may improve curing by facilitating the ingress of water within cementitious mixture 30. According to an alternative embodiment, structure layer 40 and/or adhesive layer 60 are hydrophilic (e.g., absorbent, etc.) and facilitate the absorption of water into cementitious mixture 30. In some embodiments, cementitious mixture 30 includes interconnection particles that join together upon activation (e.g., heating, etc.) to form structure layer 40.

Adhesive Layer

According to an exemplary embodiment, adhesive layer 60 is applied to couple (e.g., connect, etc.) permeable layer 20 and impermeable layer 50 to cementitious mixture 30, structure layer 40, and/or each other. In some embodiments, adhesive layer 60 is applied to couple permeable layer 20 and impermeable layer 50 together, without adhesively coupling permeable layer 20 and/or impermeable layer 50 to cementitious mixture 30 and/or structure layer 40. In some embodiments, adhesive layer 60 is configured to fully serve the function of structure layer 40 (e.g., replace and provide the benefits of structure layer 40, such that cementitious composite 10 does not need structure layer 40, to connect permeable layer 20 and impermeable layer 50 to cementitious mixture 30 and/or to each other, to hold cementitious composite 10 together when handling, etc.). Adhesive layer 60 may include various materials including one or more of hot melt, APO/APAO, PUR, polyurethane, other hot melts, animal glue, single component adhesive, multi component adhesive, epoxy, other adhesives, rubbers, silicon adhesives, cyanoacrylate adhesives, Solvent Cements, 3M 94ca, DHM Adhesives 4291, etc. According to an exemplary embodiment, the adhesive of adhesive layer 60 is a non-water based adhesive such that cementitious materials 32 of cementitious mixture 30 are not activated, or are minimally or partially activated, when adhesive layer 60 comes into contact therewith. Aggregates 34 and other larger particles within cementitious mixture 30 (e.g., particles other than cementitious materials 32, sand, other granules, etc.) may be configured to facilitate adhesive bonding.

Adhesive layer 60 may have a permanent bond strength and may have a short open time (e.g., tacky for a predefined period of time when exposed to air; one minute, two minutes, five minutes, ten minutes, etc.) such that the material thereof dries quickly after being deposited (e.g., onto permeable layer 20, onto impermeable layer 50, onto cementitious mixture 30, into cementitious mixture 30, etc.) to hold the various layers of the cementitious composite 10 together and to be able to be rolled quickly thereafter. Heat may be applied to, over, and/or along adhesive layer 60 after application thereof to cementitious composite 10 to accelerate curing and/or hardening. Adhesive layer 60 may dry to a semi-flexible form and thereby be configured to facilitate rolling of cementitious composite 10.

In some embodiments, adhesive layer 60 is applied in a specific pattern (e.g., sheet layer, grid layer, pin layer, etc.). Depending on the pattern, adhesive layer 60 may improve the structural properties of cementitious composite 10, including, by way of example only, improving post cement hardening (e.g., post-hydration structural properties, etc.), increasing plasticity, improving strain hardening, reducing cracking, increasing impact strength, and/or increasing flexural strength, among other improvements. In one embodiment, a first adhesive layer 60 is deposited onto impermeable layer 50, then cementitious mixture 30 is deposited onto the first adhesive layer 60, then a second adhesive layer 60 is deposited onto the top surface of cementitious mixture 30, and finally permeable layer 20 is disposed along the second adhesive layer 60. In some embodiments, structure layer 40 is disposed along the first adhesive layer 60 prior to cementitious mixture 30 being deposited thereon. In another embodiment, adhesive layer 60 is applied through cementitious mixture 30 (e.g., after cementitious mixture 30 is deposited onto impermeable layer 50, with an injector device, etc.) before or after permeable layer 20 is applied.

As shown in FIG. 4, adhesive layer 60 includes a first adhesive layer, shown as lower adhesive layer 62, positioned between inner side 52 of impermeable layer 50 and the bottom side of structure layer 40 and cementitious mixture 30 to couple the bottom side of structure layer 40 and/or cementitious mixture 30 to impermeable layer 50. As shown in FIG. 4, adhesive layer 60 includes a second adhesive layer, shown as upper adhesive layer 64, positioned between inner side 22 of permeable layer 20 and the top side of structure layer 40 and cementitious mixture 30 to couple the top side of structure layer 40 and/or cementitious mixture 30 to permeable layer 20. By way of example, manufacturing cementitious composite 10 of FIG. 4 may include (i) providing impermeable layer 50, (ii) applying lower adhesive layer 62 along impermeable layer 50, (iii) disposing the bottom side of structure layer 40 along lower adhesive layer 62, (iv) depositing cementitious mixture 30 into structure layer 40 and along lower adhesive layer 62, (v) applying second adhesive layer 64 to the top side of structure layer 40 and cementitious mixture 30, and (vi) disposing permeable layer 20 along upper adhesive layer 64. In some embodiments, cementitious composite 10 of FIG. 4 does not include structure layer 40.

Permeable Layer

According to the exemplary embodiment shown in FIGS. 2-4, permeable layer 20 facilitates the dispersion of a fluid (e.g., water, etc.) into cementitious composite 10 while retaining cementitious mixture 30. Permeable layer 20 may include specified characteristics that manage the flow of the fluid through permeable layer 20. According to an exemplary embodiment, the specified characteristics allow for the hydration of cementitious mixture 30 without allowing cementitious materials 32, aggregates 34, absorbent material 36, and/or additives to migrate from cementitious composite 10 (e.g., during handling before in-situ hydration, during in-situ hydration, etc.). In other embodiments, the specified characteristics may also maintain the mix ratio of cementitious mixture 30 during the hydration and hardening processes. Further, permeable layer 20 may maintain the level of compaction of cementitious mixture 30 by applying consistent pressure to cementitious mixture 30. According to an exemplary embodiment, less than 10 percent by weight of cementitious mixture 30 and migrates through permeable layer 20 prior to in-situ hydration. In some embodiments, up to 10 percent by weight of cementitious mixture 30 may migrate through permeable layer 20 while maintaining adequate performance of cementitious composite 10 after in-situ hydration.

According to an exemplary embodiment, permeable layer 20 includes a plurality of apertures, among other features, having a specified shape, area, frequency, and/or spacing. By way of example, the apertures may have a specified shape (e.g., circular, ovular, rectangular, etc.), depending on the particular application of cementitious composite 10. According to an exemplary embodiment, the size of the apertures may also be specified. By way of example, oversized apertures may allow sieving of cementitious mixture 30 prior to in-situ hydration. In contrast, undersized apertures may provide too slow or incomplete hydration of cementitious mixture 30. According to an exemplary embodiment, the apertures are designed to prevent particles less than fifteen microns from migrating from cementitious composite 10 and have an area of between 0.001 and 3 square millimeters. According to an exemplary embodiment, the frequency of the apertures may be specified to facilitate the transfer of water into cementitious mixture 30. According to an exemplary embodiment, permeable layer 20 includes between one and twelve thousand apertures per square inch. According to an alternative embodiment, permeable layer 20 is a permeable material that does not include apertures (e.g., a fibrous material, paper, etc.).

According to an exemplary embodiment, permeable layer 20 is coupled to structure layer 40 and/or adhesive layer 60 during the manufacturing process. Such a permeable layer 20 may be designed as a removable product that does not remain coupled with structure layer 40 and/or adhesive layer 60 throughout the life of cementitious composite 10. According to an exemplary embodiment, permeable layer 20 includes a containment sheet (e.g., biodegradable paper, water soluble plastic, etc.) that secures cementitious mixture 30 during the transportation of cementitious composite 10. In some embodiments, the containment sheet may be removed before or after the cementitious composite 10 is in place in the field. Such removal of the containment sheet may occur either before or after in-situ hydration. In either embodiment, permeable layer 20 may include flow channels (e.g., perforations, etc.) designed to facilitate the flow of water into cementitious mixture 30. In some embodiments, outer side of permeable layer 20 has a texture and/or defines channels that are conducive to the transport of water (e.g., to remove water from outer side, to direct water from outer side, etc.). According to an alternative embodiment, permeable layer 20 is not removed and erodes in the field from weathering without compromising the structural performance of cementitious composite 10. According to an alternative embodiment, permeable layer 20 is treated with a coating (e.g., for ultraviolet resistance, etc.) to extend service life in the field.

According to an exemplary embodiment, inner side 22 of permeable layer 20 is bonded to structure layer 40 and/or adhesive layer 60 after a heat treatment process. In one embodiment, permeable layer 20 has a melting point that is greater than the melting point of structure layer 40 and/or adhesive layer 60. By way of example, PVA fabric may have a melting point of between 356 and 374 degrees Fahrenheit. Permeable layer 20 (e.g., a PVA fabric, etc.) may be placed in contact with portions of structure layer 40 and/or adhesive layer 60. Heat may be subsequently applied (e.g., topically, etc.) to permeable layer 20 (e.g., with a heated roller, with a heated air stream, with a hot plate, with a furnace, etc.) to melt the ends of the portions of the structure layer 40 and/or adhesive layer 60 without melting permeable layer 20, thereby bonding permeable layer 20 with structure layer 40 and/or adhesive layer 60.

By way of example, the applied heat may deform the portions of structure layer 40 and/or adhesive layer 60 disposed along inner side 22 of permeable layer 20 (e.g., a PVA fabric, etc.). The portions of structure layer 40 and/or adhesive layer 60 internal to cementitious mixture 30 may remain intact (i.e., may not melt) even after the application of heat. The permeable layer 20 may be in contact with cementitious mixture 30 (e.g., may fuse against cementitious mixture 30, etc.) after heating, thereby retaining cementitious mixture 30, and restricting movement of cementitious materials 32, aggregates 34, absorbent material 36, and/or additives within cementitious composite 10. By way of example, a heated roller or plate may be used to both heat permeable layer 20 and compress cementitious composite 10. By way of another example, a temperature neutral roller or a cooled roller may be used to apply compression to permeable layer 20 after the application of heat. Such an additional roller may also cool permeable layer 20. According to an alternative embodiment, permeable layer 20 has a melting point that is less than or equal to the melting point of structure layer 40 and/or adhesive layer 60.

According to an exemplary embodiment, permeable layer 20 includes a water soluble material (e.g., a cold water soluble material, etc.). In some embodiments, the water soluble material is a fabric material or a film material, and such fabric material may be woven or nonwoven. In one embodiment, the fabric material is a cold water soluble nonwoven material manufactured from partially hydrolyzed polyvinyl alcohol fibers (a PVA fabric). The PVA fabric may be impermeable to cementitious materials, thereby reducing the migration of cementitious mixture 30 from cementitious composite 10. In some embodiments, the PVA fabric is permeable to water. In other embodiments, the PVA fabric substantially retains water until the water soluble material disintegrates. In still other embodiments, the PVA fabric is substantially impermeable to water until the water soluble material disintegrates. According to an exemplary embodiment, permeable layer 20 has a surface (e.g., a nonwoven surface, etc.) having a roughness selected to facilitate bonding (e.g., a large surface roughness such that adhesive layer 60 and/or structure layer 40 better bond to inner side 22 of permeable layer 20, etc.). According to another exemplary embodiment, permeable layer 20 is treated with a coating to facilitate bonding (e.g., a fusible water soluble embroidery stabilizer, "Wet N Gone Fusible®," etc.).

Cementitious composite 10 may be positioned and hydrated in-situ. According to an exemplary embodiment, permeable layer 20 is a water soluble material (e.g., PVA fabric, etc.). After installation of cementitious composite 10, an operator may apply water topically to hydrate cementitious mixture 30. In one embodiment, the water soluble material prevents displacement of cementitious mixture 30 (i.e., prevents the cementitious material from washing away) until the water soluble material disintegrates. Such protection may facilitate the use of higher-pressure water sources during the hydration process. A disintegration time for the water soluble material may be selected to facilitate hydration. By way of example, the disintegration time may be less than one minute. According to an exemplary embodiment, water soluble material is positioned along the sides of structure layer 40, adhesive layer 60, and/or cementitious mixture 30 such that, upon application of water, the water soluble fabric disintegrates. Upon the application of water, cementitious mixture 30 begins its initial setting period.

In one embodiment, cementitious materials 32, absorbent material 36, and/or additives positioned along the water soluble material may begin to lock, set, or "gel" within structure layer 40 and/or adhesive layer 60 to prevent washout of the mix (e.g., cementitious materials 32, aggregates 34, etc. positioned along a middle portion of cementitious mixture 30, etc.). In another embodiment, the mix of cementitious materials 32 and/or absorbent material 36 within cementitious mixture 30 are designed to partially diffuse such that a small portion of the mix flows laterally outward before or during the initial setting. Such lateral flow may facilitate the coupling of adjacent panels or rolls of cementitious composite 10 (e.g., panels or rolls positioned along one another, panels or rolls touching one another, panels or rolls spaced two millimeters or another distance from one another, etc.). By way of example, cementitious materials 32, absorbent material 36, and/or additives along the permeable layers of two adjacent panels may begin to gel during the initial setting period and bond together, thereby fusing the adjacent panels or rolls. By way of another example, cementitious materials 32, absorbent material 36, and/or additives from adjacent panels or rolls may mix together and harden to form a rigid joint. In some embodiments, the composition of cementitious mixture 30 is designed to facilitate such lateral coupling. In one embodiment, the water soluble material facilitates the transport of water into cementitious composite 10. By way of example, the water soluble material may include apertures to facilitate water flow, a woven configuration that transports the water into cementitious mixture 30, or still another structure. By way of another example, the surface of cementitious mixture 30 positioned along the water soluble material may begin to gel and (i) retain (e.g., reduce the migration of, contain, limit movement of, etc.) cementitious materials 32, aggregates 34, and/or additives positioned within a middle portion of cementitious mixture 30 and/or (ii) facilitate the flow of water into cementitious mixture 30. Cementitious materials 32, absorbent material 36, and/or additives within cementitious mixture 30 may be activated during and following the disintegration process of the water soluble material. After the disintegration time, cementitious composite 10 may have a bare surface (e.g., cementitious mixture 30 is exposed after hardening, etc.).

Impermeable Layer

Referring to the exemplary embodiment shown in FIGS. 2-4, impermeable layer 50 includes a material capable of retaining cementitious mixture 30 and hydration water without degrading after interacting with cementitious mixture 30 (e.g., cementitious materials 32, etc.). Impermeable layer 50 may serve as a base to place cementitious mixture 30 over. In one embodiment, impermeable layer 50 includes a plastic based material (e.g., polypropylene, PVC, polyolefin, polyethylene, etc.). In some embodiments, impermeable layer 50 includes the same material as structure layer 40. Manufacturing both impermeable layer 50 and structure layer 40 from similar materials facilitates increasing bond strength between impermeable layer 50 and structure layer 40.

As shown in FIG. 4, inner side 52 of impermeable layer 50 is coupled along a bottom surface of structure layer 40, adhesive layer 60, and/or cementitious mixture 30. Where impermeable layer 50 is positioned along the bottom surface of structure layer 40, adhesive layer 60, and/or cementitious mixture 30, impermeable layer 50 may experience a portion of the flexural and tensile stresses. Such a position may improve the strength and ductility of cementitious composite 10. In some embodiments, impermeable layer 50 is a sheet that includes a flexible material (e.g., to facilitate rolling cementitious composite 10, etc.) that is capable of being coupled with structure layer 40, adhesive layer 60, and/or cementitious mixture 30 without allowing a fluid to seep through. According to an alternative embodiment, impermeable layer 50 may be integrally formed with or otherwise coupled to structure layer 40 and/or adhesive layer 60. According to an alternative embodiment, impermeable layer 50 may protect cementitious mixture 30 from exposure to certain chemicals (e.g., from sulfate introduced by soils in the field, etc.). In some embodiments, outer side of impermeable layer 50 includes protrusions (e.g., extensions, barbs, etc.). The protrusions may facilitate securing cementitious composite 10 to various substrates (e.g., dirt, grass, gravel, etc.). In some embodiments, the outer side of impermeable layer 50 is coated with an adhesive and covered by a removable liner. The removable liner may be removed during installation such that the adhesive on the outer side of impermeable layer 50 attaches cementitious composite 10 to a respective substrate.

Constituent Relationships

According to an exemplary embodiment, the relationship between the various constituents within cementitious composite 10 (e.g., the constituents of cementitious mixture 30, etc.) are selected such that cementitious composite 10 facilitates water absorption to set and cure cementitious mixture 30 and provides desired performance characteristics or properties (e.g., 28 day compressive strength, etc.). Applicant has found that if the volume of voids 38 within cementitious mixture 30 is too large, the amount of water that enters cementitious composite 10 during in-situ hydration may be excessive, thereby overhydrating cementitious mixture 30 such that cementitious mixture 30 sets and cures with reduced strength. Applicant has further found that if the volume of voids 38 within cementitious mixture 30 is too small, not enough water may penetrate into cementitious mixture 30 during in-situ hydration such that portions of cementitious mixture 30 may not react with water and fail to set and cure, again reducing the strength thereof. Applicant has found a preferred range for a fraction of voids 38 relative to cementitious mixture 30 within cementitious composite 10 that facilitates appropriately hydrating cementitious mixture 30. Appropriately hydrating cementitious composite 10 facilitates providing a cementitious composite 10 having improved (e.g., optimal, etc.) performance characteristics (e.g., 28 day compressive strength, etc.).

The total volume per unit area of cementitious composite 10 may be represented by the following expression:

$$V_t = V_p + V_s + V_i + V_a + V_b \quad (1)$$

where $V_t$ is the total volume per unit area of cementitious composite 10, $V_p$ is the volume of permeable layer 20 per unit area of cementitious composite 10, $V_s$ is the volume of structure layer 40 per unit area of cementitious composite 10, $V_i$ is the volume of impermeable layer 50 per unit area of cementitious composite 10, $V_a$ is the volume of adhesive layer 60 per unit area of cementitious composite 10, and $V_b$ is the bulk volume of cementitious mixture 30 within cementitious composite 10 including cementitious materials 32, aggregates 34, absorbent material 36, voids 38, and/or other constituents (e.g., additives, limes, fibers, retarders, accelerators, etc.) that may be provided as part of cementitious mixture 30 per unit area of cementitious composite 10.

The total mass per unit area of cementitious composite 10 may be represented by the following expression:

$$M_t = M_p + M_s + M_i + M_a + M_c + \sum_{i}^{n} M_{nc_i} \quad (2)$$

where $M_t$ is the total mass per unit area of cementitious composite 10, $M_p$ is the mass of permeable layer 20 per unit area of cementitious composite 10, $M_s$ is the mass of structure layer 40 per unit area of cementitious composite 10, $M_i$ is the mass of impermeable layer 50 per unit area of cementitious composite 10, $M_a$ is the mass of adhesive layer 60 per unit area of cementitious composite 10, $M_c$ is the mass of cementitious materials 32 provided as part of cementitious mixture 30 per unit area of cementitious composite 10, and $M_{nc_i}$ is the mass of each individual type of constituent of the non-cementitious materials (e.g., aggregates 34, absorbent material 36, additives, lime, fibers, retarders, accelerators, etc.) provided as part of cementitious mixture 30 per unit area of cementitious composite 10, which may be totaled to get the total mass of the non-cementitious materials. The maximum total mass of cementitious composite 10 per unit area may be predetermined by shipping and handling requirements. In one embodiment, the maximum total mass of cementitious composite 10 per unit area is selected such that cementitious composite 10 has a maximum total weight of approximately two pounds per square foot. In other embodiments, the maximum total weight of cementitious composite 10 per unit area is greater than or less than two pounds per square foot (e.g., 1, 1.25, 1.5, 1.75, 2.25, 2.5, 2.75, 3, 4, 5, etc. pounds per square foot, etc.).

The bulk volume of cementitious mixture 30 per unit area may be represented by the following expression:

$$V_b = V_c + V_{nc} + V_v \tag{3}$$

where $V_c$ is the volume of cementitious materials 32 within cementitious mixture 30 per unit area of cementitious composite 10, $V_{nc}$ is the volume of the non-cementitious materials within cementitious mixture 30 per unit area of cementitious composite 10, and $V_v$ is the volume of voids 38 within cementitious composite 10 between all of the constituent materials (e.g., cementitious materials 32 and the non-cementitious materials including aggregate 34, absorbent material, additives, etc.) of cementitious mixture 30 per unit area of cementitious composite 10. In some embodiments, the volume of the non-cementitious material and/or the mass of the non-cementitious material within cementitious mixture 30 is negligible.

The volume of the cementitious materials 32 of cementitious mixture 30 per unit area may be represented by the following expression:

$$V_c = \frac{M_c}{\rho_c} \tag{4}$$

where $\rho_c$ is the density of cementitious materials 32 of cementitious mixture 30. The volume of the non-cementitious materials per unit area may similarly be represented by the following expression:

$$V_{nc} = \sum_i^n \frac{M_{nc_i}}{\rho_{nc_i}} \tag{5}$$

where $\rho_{nc_i}$ is the density of each individual type of constituent of the non-cementitious materials of cementitious mixture 30. The density of cementitious materials 32 and/or the density of the non-cementitious materials of cementitious mixture 30 may be determined based on the combined specific gravity of the respective constituents thereof. The combined specific gravity may be determined based on (i) the specific gravity of each individual type of constituent within cementitious materials 32 and/or the non-cementitious material and (ii) the volume fraction of each individual type of constituent within cementitious materials 32 and/or the non-cementitious material (e.g., aggregate 34, absorbent material, etc.) relative to the total volume of the constituents of cementitious materials 32 and/or the non-cementitious material, respectively, per unit area of cementitious composite 10.

The ratio of the volume of voids 38 within cementitious mixture 30 relative to the volume of cementitious materials 32 provided as part of cementitious mixture 30 may provide a void fraction represented by the following expression:

$$F_v = \frac{V_v}{V_c} = \frac{V_v}{\frac{M_c}{\rho_c}} = V_v \cdot \frac{\rho_c}{M_c} \tag{6}$$

where $F_v$ is the void fraction for cementitious mixture 30 per unit area of cementitious composite 10 (i.e., the ratio of the volume of voids 38 within cementitious mixture 30 relative to the volume of cementitious materials 32 of cementitious mixture 30).

Solving for the volume of voids 38 in Equation (6) and then substituting the volume of voids 38 from Equation (6), the volume of non-cementitious materials in Equation (5), and the volume of cementitious materials 32 in Equation (4) into Equation (3) results in the following expression:

$$V_b = \frac{M_c}{\rho_c} + \sum_i^n \frac{M_{nc_i}}{\rho_{nc_i}} + F_v \cdot \frac{M_c}{\rho_c} = \frac{M_c}{\rho_c}(1 + F_v) + \sum_i^n \frac{M_{nc_i}}{\rho_{nc_i}} \tag{7}$$

Applicant has determined and confirmed experimentally that cementitious composite 10 has unexpected enhanced performance (e.g., a maximum 28-day compressive strength, etc.) when the void fraction, per unit area of cementitious composite 10, for cementitious mixture 30 is within the following range:

$$0.64 \leq F_v \leq 1.35 \tag{8}$$

Applicant has determined that a cementitious mixture 30 having a void fraction less than 0.64 leads to cementitious mixture 30 being overly dense such that water does not adequately permeate through cementitious composite 10 and properly activate cementitious materials 32 and the other constituents of cementitious mixture 30. Applicant has also determined that cementitious mixture 30 having a void fraction greater than 1.35 leads to cementitious mixture 30 being too loose such that the resultant hydrated cementitious composite 10 has an undesirably low strength. Further, if the void fraction exceeds 1.35, cementitious composite 10 does not hold together upon hydration. By providing cementitious composite 10 with cementitious mixture 30 having a void fraction between 0.64 and 1.35, cementitious composite 10 can be adequately and properly hydrated such that cementitious composite 10 exhibits enhanced post-hydration and post-cure properties (e.g., maximum 28-day compressive strength, etc.). In some embodiments, the void fraction that provides the enhanced post-hydration and post-cure properties is greater than 0.80 (i.e., between 0.80 and 1.35). In some embodiments, the void fraction that provides the enhanced post-hydration and post-cure properties is less than 1 (i.e., between 0.64 and 1). In some embodiments, the void fraction that provides the enhanced post-hydration and post-cure properties is between 0.90 and 1.25. In some embodiments, the void fraction that provides the enhanced post-hydration and post-cure properties is between 0.95 and 1.2. In some embodiments, the void fraction that provides the enhanced post-hydration and post-cure properties is between 1 and 1.15.

According to another embodiment, cementitious composite 10 has a void fraction between 0.30 and approximately 0.64. Such a cementitious composite 10 may be used in applications involving high pressure hydration (e.g., hydration with a jet stream, hydration with a power washer, hydration with a high pressure hydration source, etc.). Such a low amount of void space (i.e., high compaction) may facilitate providing a thinner end product to facilitate more efficient packaging and shipping. The high pressure hydration may effectively break up cementitious mixture 30 having such a high amount of compaction (i.e., low void fraction) to facilitate adequate hydration (e.g., the high power hydration breaks down the compaction, effectively creating more void space, etc.). A cementitious composite 10 having a void fraction from 0.64 to 1.35 may be adequately hydrated using low pressure hydration (e.g., with a standard hose, with a lower pressure hydration source, etc.).

According to another embodiment, cementitious composite 10 has a void fraction between 0.10 and 5.0. Such a cementitious composite 10 may have a cementitious mixture 30 that at least one of (i) includes colloidal cement, (ii) is compacted in a specific arrangement, and (iii) undergoes a specific treatment process to provide particles of varying size and/or shape. By way of example, cementitious mixture 30 may be mixed in a colloidal and/or high shear mixer that may facilitate using a lesser amount water to adequately hydrate cementitious mixture 30. By way of another example, cementitious mixture 30 may undergo a specialty constituent treatment process. For example, the constituents of cementitious mixture 30 may be milled or graded into particles of varying size and/or shape before being mixed together.

Applicant has also determined and confirmed experimentally a mass of water per unit area relative to the mass of cementitious materials 32 per unit area that the cementitious mixture 30 absorbs during in-situ hydration that provides the enhanced post-hydration and post-cure properties (e.g., a maximum 28-day compressive strength, etc.) of cementitious composite 10. Such a mass of water per unit area may be represented by the following expression:

$$M_w = x \cdot M_c \quad (9)$$

where $M_w$ is the mass of water per unit area and x is a hydration ratio of the mass of water added to the cementitious mixture 30 relative to the mass of cementitious materials 32 of cementitious mixture 30 per unit area (i.e., a water-to-cement ratio). According to an exemplary embodiment, x is between a lower hydration ratio threshold of 0.25 and an upper hydration ratio threshold of 0.55. The lower hydration ratio threshold of 0.25 may correspond with the lower void fraction value (e.g., 0.64, etc.), an intermediate hydration ratio of 0.30 may correspond with an intermediate void fraction value (e.g., 0.80, etc.), and the upper hydration ratio threshold of 0.55 may correspond with the upper void fraction value (e.g., 1.35, etc.). The hydration ratio threshold may vary with the mass of cementitious materials 32 per unit area and/or the volume of voids 38 per unit area, among other characteristics. Applicant has found that if the mass of cementitious materials 32 per unit area is relatively low, a lesser mass of water needs to be applied to cementitious composite 10 and that if the mass of cementitious materials 32 per unit area is relatively large, a greater mass of water needs to be applied to cementitious composite 10. In some embodiments, the lower hydration ratio threshold is greater than 0.25 (e.g., 0.28, 0.30, 0.31, 0.32, 0.34, 0.35, 0.36, 0.37, 0.38, 0.39, 0.40, 0.41, 0.42, 0.43, 0.44, 0.45, etc.) or less than 0.25 (e.g., 0.10, 0.12, 0.15, 0.18, 0.20, 0.22, etc.). In some embodiments, the upper hydration ratio threshold is greater than 0.55 (e.g., 5, 0.56, 0.57, 0.58, 0.59, 0.60, 0.61, 0.62, 0.63, 0.64, 0.65, etc.) or less than 0.55 (e.g., 0.54, 0.53, 0.52, 0.51, 0.50, 0.49, 0.48, 0.47, 0.46, etc.).

According to another embodiment, cementitious composite 10 having a cementitious mixture 30 that at least one of (i) includes colloidal cement, (ii) is compacted in a specific arrangement, and (iii) undergoes a specific treatment process to provide particles of varying size and/or shape requires a hydration ratio between 0.15 and 3.5 to provide the enhanced post-hydration and post-cure properties (e.g., a maximum 28-day compressive strength, etc.) of cementitious composite 10. In some embodiments, cementitious mixture 30 includes a viscosifier or a relatively higher dose of a viscosity modifier at higher hydration ratios (e.g., higher than 0.55, etc.).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described are considered to be within the scope of the invention.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It should be noted that the orientation of various elements may differ according to other exemplary embodiments and that such variations are intended to be encompassed by the present disclosure.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" may be used to mean serving as an example, instance or illustration. Any embodiment or design described herein as "exemplary" may be not necessarily to be construed as preferred or advantageous over other embodiments or designs. Rather, use of the word exemplary may be intended to present concepts in a concrete manner. Accordingly, all such modifications are intended to be included within the scope of the present inventions. The order or sequence of any process or method steps may be varied or re-sequenced according to alternative embodiments. Any means-plus-function clause may be intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure.

The invention claimed is:

1. A cementitious composite for in-situ hydration, the cementitious composite comprising:
    a first layer;
    a second layer spaced from the first layer; and
    a cementitious mixture disposed between the first layer and the second layer, the cementitious mixture including cementitious materials and non-cementitious materials including a viscosity modifier, the cementitious materials shaped and arranged to provide a void fraction between 0.64 and 1.35, wherein the void fraction is defined as the ratio of the volume of the voids within the cementitious mixture per unit area of the cementitious composite to the volume of the cementitious materials per unit area of the cementitious composite;
    wherein the cementitious mixture is configured to absorb a mass of water that provides a maximum 28 day compressive strength of the cementitious composite; and
    wherein:

$$M_w = x \cdot M_c$$

where:
    $M_w$ is the mass of the water per unit area of the cementitious composite;
    $M_c$ is a mass of the cementitious materials of the cementitious mixture per unit area of the cementitious composite; and
    x is a ratio of the mass of the water relative to the mass of the cementitious materials of the cementitious mixture per unit area of the cementitious composite that provides the maximum 28 day compressive strength of the cementitious composite, wherein x is between 0.25 and 0.55.

2. The cementitious composite of claim 1, wherein the first layer is a sealing layer positioned to seal a first side of the cementitious composite such that the cementitious mixture and water do not migrate through the first side, and wherein the second layer is a containment layer positioned at an opposite second side of the cementitious composite to at least partially contain the cementitious mixture within the cementitious composite.

3. The cementitious composite of claim 2, wherein the containment layer is water permeable and thereby configured to facilitate the in-situ hydration of the cementitious mixture.

4. The cementitious composite of claim 1, wherein the second layer is water soluble or dissolvable.

5. The cementitious composite of claim 1, wherein the second layer is biodegradable.

6. The cementitious composite of claim 1, wherein the second layer is removable.

7. The cementitious composite of claim 1, wherein the cementitious mixture includes at least one of a superabsorbent polymer or an accelerator.

8. A cementitious composite for in-situ hydration, the cementitious composite comprising:
    a first layer;
    a second layer spaced from the first layer; and
    a cementitious mixture disposed between the first layer and the second layer, the cementitious mixture including cementitious materials and non-cementitious materials including an accelerator, the cementitious materials shaped and arranged to provide a void fraction between 0.64 and 1.35, wherein the void fraction is defined as the ratio of the volume of the voids within the cementitious mixture per unit area of the cementitious composite to the volume of the cementitious materials per unit area of the cementitious composite;
    wherein the cementitious mixture is configured to absorb a mass of water that provides a maximum 28 day compressive strength of the cementitious composite; and
    wherein:

$$M_w = x \cdot M_c$$

where:
    $M_w$ is the mass of the water per unit area of the cementitious composite;
    $M_c$ is a mass of the cementitious materials of the cementitious mixture per unit area of the cementitious composite; and
    x is a ratio of the mass of the water relative to the mass of the cementitious materials of the cementitious mixture per unit area of the cementitious composite that provides the maximum 28 day compressive strength of the cementitious composite, wherein x is between 0.25 and 0.55.

9. The cementitious composite of claim 8, wherein the first layer is a sealing layer positioned to seal a first side of the cementitious composite such that the cementitious mixture and water do not migrate through the first side, and wherein the second layer is a containment layer positioned at an opposite second side of the cementitious composite to at least partially contain the cementitious mixture within the cementitious composite.

10. The cementitious composite of claim 9, wherein the containment layer is water permeable and thereby configured to facilitate the in-situ hydration of the cementitious mixture.

11. The cementitious composite of claim 8, wherein the second layer is water soluble or dissolvable.

12. The cementitious composite of claim 8, wherein the second layer is biodegradable.

13. The cementitious composite of claim 8, wherein the second layer is selectively removable.

14. The cementitious composite of claim 8, wherein the cementitious mixture includes at least one of a superabsorbent polymer or a viscosity modifier.

15. A cementitious composite for in-situ hydration, the cementitious composite comprising:
a first layer that is water soluble, dissolvable, biodegradable, or removable;
a second layer spaced from the first layer; and
a cementitious mixture disposed between the first layer and the second layer, the cementitious mixture including cementitious materials and non-cementitious materials, the cementitious materials shaped and arranged to provide a void fraction between 0.64 and 1.35, wherein the void fraction is defined as the ratio of the volume of the voids within the cementitious mixture per unit area of the cementitious composite to the volume of the cementitious materials per unit area of the cementitious composite;
wherein the cementitious mixture is configured to absorb a mass of water that provides a maximum 28 day compressive strength of the cementitious composite; and wherein:

$$M_w = x \cdot M_c$$

where:
$M_w$ is the mass of the water per unit area of the cementitious composite;
$M_c$ is a mass of the cementitious materials of the cementitious mixture per unit area of the cementitious composite; and
x is a ratio of the mass of the water relative to the mass of the cementitious materials of the cementitious mixture per unit area of the cementitious composite that provides the maximum 28 day compressive strength of the cementitious composite, wherein x is between 0.25 and 0.55.

16. The cementitious composite of claim 15, wherein the second layer is a sealing layer positioned to seal a bottom of the cementitious composite such that the cementitious mixture and water do not migrate through the bottom, wherein the first layer is a containment layer positioned at a top of the cementitious composite to at least partially contain the cementitious mixture within the cementitious composite, and wherein the containment layer is water permeable and thereby configured to facilitate the in-situ hydration of the cementitious mixture.

17. The cementitious composite of claim 15, wherein the cementitious mixture includes at least one of a superabsorbent polymer, an accelerator, or a viscosity modifier.

18. The cementitious composite of claim 15, wherein the second layer is water soluble or dissolvable.

19. The cementitious composite of claim 15, wherein the second layer is biodegradable.

20. The cementitious composite of claim 15, wherein the second layer is selectively removable.

* * * * *